United States Patent
Winebrand

(10) Patent No.: US 9,823,774 B2
(45) Date of Patent: Nov. 21, 2017

(54) NOISE REDUCTION IN A DIGITIZER SYSTEM

(71) Applicant: Microsoft Technology Licensing, LLC, Redmond, WA (US)

(72) Inventor: Amil Winebrand, Petach-Tikva (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/050,656

(22) Filed: Feb. 23, 2016

(65) Prior Publication Data

US 2017/0242520 A1    Aug. 24, 2017

(51) Int. Cl.
| | | |
|---|---|---|
| G09G 5/00 | (2006.01) | |
| G06F 3/041 | (2006.01) | |
| G06F 3/044 | (2006.01) | |
| G06F 3/0354 | (2013.01) | |
| G06F 3/038 | (2013.01) | |

(52) U.S. Cl.
CPC .......... *G06F 3/0416* (2013.01); *G06F 3/0383* (2013.01); *G06F 3/03545* (2013.01); *G06F 3/044* (2013.01); *G06F 3/0412* (2013.01); *G06F 2203/04104* (2013.01)

(58) Field of Classification Search
CPC .... G06F 3/03547; G06F 3/0418; G06F 3/046; G06F 3/047; G06F 2203/04101; G06F 3/03545; G06F 2203/041; G06F 2203/04108
USPC ............................. 345/174, 179; 178/18.06
See application file for complete search history.

(56) References Cited

U.S. PATENT DOCUMENTS

| | | |
|---|---|---|
| 4,398,720 A | 8/1983 | Jones et al. |
| 4,591,710 A | 5/1986 | Komadina et al. |
| 4,672,154 A | 6/1987 | Rodgers et al. |
| 4,686,332 A | 8/1987 | Greanias et al. |
| 4,707,845 A | 11/1987 | Krein et al. |

(Continued)

FOREIGN PATENT DOCUMENTS

| | | |
|---|---|---|
| EP | 0684580 | 11/1995 |
| EP | 1422601 | 5/2004 |

(Continued)

OTHER PUBLICATIONS

Official Action dated Dec. 30, 2016From the U.S. Patent and Trademark Office Re. U.S. Appl. No. 13/892,381. (24 pages).

(Continued)

*Primary Examiner* — Jennifer Nguyen

(57) ABSTRACT

A method includes detecting a first signal on first electrodes along a first axis of a digitizer sensor, detecting a second signal on second electrodes along a second axis of the digitizer sensor, determining that hand input exists over the first electrodes based at least on the first signal and no hand input exists over the second electrodes. A first phase of the first signal detected on the second electrodes is determined. A second phase of the second signal detected on the first electrodes is estimated based on the first phase and a portion of the first signal associated with the second phase is extracted. Coordinates of a handheld device is determined based on the portion of the first signal extracted from the first electrodes and the second signal and the coordinates are reported to a host computing device associated with the digitizer sensor.

20 Claims, 3 Drawing Sheets

(56) References Cited

U.S. PATENT DOCUMENTS

| | | | |
|---|---|---|---|
| 4,791,592 A | 12/1988 | Burgess |
| 4,977,397 A | 12/1990 | Kuo et al. |
| 5,117,071 A | 5/1992 | Greanias et al. |
| 5,129,654 A | 7/1992 | Bogner |
| 5,239,139 A | 8/1993 | Zuta |
| 5,528,002 A | 6/1996 | Katabami |
| 5,543,588 A | 8/1996 | Bisset et al. |
| 5,574,262 A | 11/1996 | Petty |
| 5,691,512 A | 11/1997 | Obi |
| 5,825,345 A | 10/1998 | Takahama et al. |
| 5,831,600 A | 11/1998 | Inoue et al. |
| 5,841,078 A | 11/1998 | Miller et al. |
| 5,854,881 A | 12/1998 | Yoshida et al. |
| 5,859,392 A | 1/1999 | Petty |
| 5,889,511 A | 3/1999 | Ong et al. |
| 5,905,489 A | 5/1999 | Takahama et al. |
| 5,923,320 A | 7/1999 | Murakami et al. |
| 5,973,676 A | 10/1999 | Kawakura |
| 6,020,849 A | 2/2000 | Fukuzaki |
| 6,081,259 A | 6/2000 | Teterwak |
| 6,229,529 B1 | 5/2001 | Yano et al. |
| 6,239,389 B1 | 5/2001 | Allen et al. |
| 6,417,846 B1 | 7/2002 | Lee |
| 6,459,424 B1 | 10/2002 | Resman |
| 6,690,156 B1 | 2/2004 | Weiner et al. |
| 6,888,536 B2 | 5/2005 | Westerman et al. |
| 7,248,249 B2 | 7/2007 | Kong et al. |
| 7,292,229 B2 | 11/2007 | Morag et al. |
| 7,372,455 B2 | 5/2008 | Perski et al. |
| 7,656,396 B2 | 2/2010 | Bosch et al. |
| 7,843,439 B2 | 11/2010 | Perski et al. |
| 7,868,874 B2 | 1/2011 | Reynolds |
| 7,995,036 B2 | 8/2011 | Perski et al. |
| 8,059,102 B2 | 11/2011 | Rimon et al. |
| 8,278,571 B2 | 10/2012 | Orsley |
| 8,289,289 B2 | 10/2012 | Rimon et al. |
| 8,402,391 B1 | 3/2013 | Doray et al. |
| 8,482,545 B2 | 7/2013 | King-Smith et al. |
| 8,994,692 B2 | 3/2015 | Yumoto et al. |
| 9,262,010 B2 * | 2/2016 | Bulea ............... G06F 3/044 |
| 9,367,168 B2 * | 6/2016 | Ahn ................. G06F 3/0416 |
| 2002/0089491 A1 | 7/2002 | Willig |
| 2003/0080946 A1 | 5/2003 | Chuang |
| 2004/0027340 A1 | 2/2004 | Muraoka et al. |
| 2004/0100450 A1 | 5/2004 | Choi |
| 2004/0155871 A1 | 8/2004 | Perski et al. |
| 2004/0160426 A1 | 8/2004 | DeGroot et al. |
| 2004/0178995 A1 | 9/2004 | Sterling |
| 2005/0189154 A1 | 9/2005 | Perski et al. |
| 2005/0271259 A1 | 12/2005 | Lorch et al. |
| 2006/0012580 A1 | 1/2006 | Perski et al. |
| 2006/0017709 A1 | 1/2006 | Okano |
| 2006/0109252 A1 | 5/2006 | Kolmykov-Zotov et al. |
| 2006/0139339 A1 | 6/2006 | Pechman et al. |
| 2007/0152976 A1 | 7/2007 | Townsend et al. |
| 2007/0285404 A1 | 12/2007 | Rimon et al. |
| 2008/0012835 A1 | 1/2008 | Rimon et al. |
| 2008/0012838 A1 | 1/2008 | Rimon |
| 2008/0128180 A1 | 6/2008 | Perski et al. |
| 2008/0238885 A1 | 10/2008 | Zachut et al. |
| 2009/0095540 A1 | 4/2009 | Zachut et al. |
| 2009/0160787 A1 | 6/2009 | Westerman et al. |
| 2009/0251434 A1 | 10/2009 | Rimon et al. |
| 2010/0060608 A1 | 3/2010 | Yousefpor |
| 2010/0155153 A1 | 6/2010 | Zachut |
| 2010/0289752 A1 | 11/2010 | Birkler |
| 2010/0321338 A1 | 12/2010 | Ely |
| 2011/0012840 A1 | 1/2011 | Hotelling et al. |
| 2011/0012855 A1 | 1/2011 | Yeh et al. |
| 2011/0084929 A1 | 4/2011 | Chang et al. |
| 2011/0155479 A1 | 6/2011 | Oda et al. |
| 2011/0175835 A1 | 7/2011 | Wang |
| 2011/0254802 A1 | 10/2011 | Philipp |
| 2011/0254807 A1 * | 10/2011 | Perski ............... G06F 3/0418 345/174 |
| 2011/0291944 A1 | 12/2011 | Simmons et al. |
| 2011/0310040 A1 | 12/2011 | Ben-Shalom et al. |
| 2012/0050180 A1 | 3/2012 | King et al. |
| 2012/0105362 A1 | 5/2012 | Kremin et al. |
| 2012/0133616 A1 | 5/2012 | Nishihara et al. |
| 2012/0158629 A1 | 6/2012 | Hinckley et al. |
| 2012/0182238 A1 | 7/2012 | Lee |
| 2013/0009896 A1 | 1/2013 | Zaliva |
| 2013/0009907 A1 | 1/2013 | Rosenberg et al. |
| 2013/0027361 A1 | 1/2013 | Perski et al. |
| 2013/0127757 A1 | 5/2013 | Mann et al. |
| 2013/0132903 A1 | 5/2013 | Krishnaswamy |
| 2013/0249950 A1 | 9/2013 | Mahmoud et al. |
| 2013/0278543 A1 | 10/2013 | Hsu et al. |
| 2013/0285973 A1 | 10/2013 | Elias et al. |
| 2013/0300672 A1 | 11/2013 | Griffin |
| 2013/0300696 A1 | 11/2013 | Haran et al. |
| 2013/0328832 A1 | 12/2013 | Boumgarten |
| 2014/0152620 A1 | 6/2014 | Perski et al. |
| 2014/0168116 A1 | 6/2014 | Sasselli et al. |
| 2014/0320445 A1 | 10/2014 | Kim |
| 2015/0049044 A1 | 2/2015 | Yousefpor et al. |
| 2015/0070310 A1 | 3/2015 | Suzuki et al. |
| 2015/0109243 A1 | 4/2015 | Jun et al. |
| 2015/0193025 A1 | 7/2015 | Rebeschi et al. |
| 2016/0041685 A1 | 2/2016 | Perski et al. |
| 2016/0274700 A1 | 9/2016 | Mishalov |
| 2017/0177110 A1 | 6/2017 | Winebrand et al. |
| 2017/0177138 A1 | 6/2017 | Orlovsky et al. |

FOREIGN PATENT DOCUMENTS

| | | |
|---|---|---|
| EP | 1717677 | 11/2006 |
| JP | 05-173698 | 7/1993 |
| JP | 07-311647 | 11/1995 |
| JP | 09-325852 | 12/1997 |
| JP | 10-031545 | 2/1998 |
| JP | 2002-207563 | 7/2002 |
| TW | 201537442 | 10/2015 |
| WO | WO 03/019346 | 3/2003 |
| WO | WO 2005/081631 | 9/2005 |
| WO | WO 2009/108334 | 9/2009 |
| WO | WO 2011/154950 | 12/2011 |
| WO | WO 2012/111010 | 8/2012 |
| WO | WO 2012/140656 | 10/2012 |
| WO | WO 2013/171747 | 11/2013 |
| WO | WO 2014/145872 | 9/2014 |

OTHER PUBLICATIONS

Written Opinion dated Feb. 1, 2017 From the International Preliminary Examining Authority Re. Application No. PCT/US2016/022760. (8 Pages).

International Search Report and the Written Opinion dated May 23, 2006 From the International Searching Authority Re. Application No. PCT/IL05/00229.

Communication Pursuant to Article 94(3) EPC dated Nov. 13, 2012 From the European Patent Office Re. Application No. 05709125.8.

Communication Pursuant to Article 94(3) EPC dated May 15, 2014 From the European Patent Office Re. Application No. 05709125.8.

Communication Pursuant to Article 94(3) EPC dated Jul. 19, 2012 From the European Patent Office Re. Application No. 05709125.8.

Communication Pursuant to Article 94(3) EPC dated Jun. 20, 2013 From the European Patent Office Re. Application No. 05709125.8.

Communication Pursuant to Article 94(3) EPC dated Nov. 22, 2013 From the European Patent Office Re. Application No. 05709125.8.

Communication Relating to the Results of the Partial International Search dated Sep. 4, 2013 From the International Searching Authority Re. Application No. PCT/IL2013/050417.

Decision to Refuse a European Patent Application (Article 97(2) EPC) dated Jul. 3, 2015 From the European Patent Office Re. Application No. 05709125.8.

International Preliminary Report on Patentability dated Nov. 27, 2014 From the International Bureau of WIPO Re. Application No. PCT/IL2013/050417.

(56) References Cited

OTHER PUBLICATIONS

International Search Report and the Written Opinion dated Jun. 3, 2016 From the International Searching Authority Re. Application No. PCT/US2016/022760.
International Search Report and the Written Opinion dated Dec. 20, 2013 From the International Searching Authority Re. Application No. PCT/IL2013/050417.
Notice of Allowance dated Jun. 10, 2015 From the U.S. Patent and Trademark Office Re. U.S. Appl. No. 14/176,289.
Notice of Allowance dated Feb. 24, 2016 From the U.S. Patent and Trademark Office Re. U.S. Appl. No. 14/886,119.
Official Action dated Jun. 5, 2012 From the U.S. Patent and Trademark Office Re. U.S. Appl. No. 13/171,601.
Official Action dated Oct. 5, 2015 From the U.S. Patent and Trademark Office Re. U.S. Appl. No. 13/892,381.
Official Action dated Dec. 8, 2009 From the U.S. Patent and Trademark Office Re. U.S. Appl. No. 11/063,535.
Official Action dated Jul. 8, 2016 From the U.S. Patent and Trademark Office Re. U.S. Appl. No. 13/892,381.
Official Action dated Jan. 13, 2016 From the U.S. Patent and Trademark Office Re. U.S. Appl. No. 13/892,381.
Official Action dated Nov. 15, 2011 From the U.S. Patent and Trademark Office Re. U.S. Appl. No. 13/171,601.
Official Action dated Mar. 18, 2015 From the U.S. Patent and Trademark Office Re. U.S. Appl. No. 13/892,381.
Official Action dated Dec. 22, 2010 From the U.S. Patent and Trademark Office Re. U.S. Appl. No. 11/063,535.
Official Action dated May 25, 2010 From the U.S. Patent and Trademark Office Re. U.S. Appl. No. 11/063,535.
Official Action dated May 27, 2009 From the U.S. Patent and Trademark Office Re. U.S. Appl. No. 11/063,535.
Official Action dated Mar. 28, 2013 From the U.S. Patent and Trademark Office Re. U.S. Appl. No. 13/644,331.
Proceedings Further With the European Patent Application Pursuant to Rule 70(2) EPC dated Apr. 13, 2012 From the European Patent Office Re. Application No. 05709125.8.
Summons to Attend Oral Proceedings Pursuant to Rule 115(1) EPC dated Dec. 15, 2014 From the European Patent Office Re. Application No. 05709125.8.
Supplementary European Search Report dated Mar. 27, 2012 From the European Patent Office Re. Application No. 05709125.8.
Translation of Decision of Rejection dated Jun. 2, 2011 From the Japanese Patent Office Re. Application No. 2007-500353.
Translation of Notification of Reasons of Rejection dated May 21, 2010 From the Japanese Patent Office Re. Application No. 2007-500353.
Hughes "Apple's Stylus Receiver Concept Would Improve the Precision of Digital Pen-Based Input", Follow AppleInsider, Quiller Media, 8 P., Jan. 29, 2015.
Park et al. "A Pen-Pressure-Sensitive Capacitive Touch System Using Electrically Coupled Resonance Pen", IEEE Journal of Solid-State Circuits, 51(1): 168-176, Jul. 30, 2015.
Wang et al. "Detecting and Leveraging Finger Orientation for Interaction with Direct-Touch Surfaces", UIST '09 Proceedings of the 22nd Annual ACM Symposium on User Interface Software and Technology: 23-32, Jul. 4, 2009.
Advisory Action Before the Filing of an Appeal Brief dated Sep. 29, 2016 From the U.S. Patent and Trademark Office Re. U.S. Appl. No. 13/892,381.
Applicant-Initiated Interview Summary dated May 2, 2017 From the U.S. Patent and Trademark Office Re. U.S. Appl. No. 13/892,381. (3 pages).
International Search Report and the Written Opinion dated Apr. 11, 2017 From the International Searching Authority Re. Application No. PCT/US2016/066737. (14 Pages).
Official Action dated Jun. 1, 2017 From the U.S. Patent and Trademark Office Re. U.S. Appl. No. 14/977,766. (35 Pages).
Official Action dated Jun. 2, 2017 From the U.S. Patent and Trademark Office Re. U.S. Appl. No. 14/977,721. (38 Pages).
Official Action dated Jun. 14, 2017 From the U.S. Patent and Trademark Office Re. U.S. Appl. No. 13/892,381. (26 pages).
International Preliminary Report on Patentability dated Jun. 6, 2017 From the International Preliminary Examining Authority Re. Application No. PCT/US2016/022760. (9 pages).

\* cited by examiner

NOISE REDUCTION IN A DIGITIZER SYSTEM

BACKGROUND

Digitizer systems are used touch detection in many Human Interface Devices (HID) such as laptops, trackpads, MP3 players, computer monitors, and smart-phones. Some digitizer systems include a capacitive based sensor that senses positioning and proximity of a conductive object such as a conductive stylus or finger used to interact with the HID. Some capacitive sensors typically include a matrix of electrode junctions arranged in rows and columns. The capacitive sensor is often integrated with an electronic display to form a touch-screen.

Signal emitting styluses, e.g. active styluses are known in the art for use with digitizer systems. Active stylus location may be tracked by sampling output from the capacitive based sensor in both row and column direction. Tracking is based on detecting a signal emitted by a tip of the stylus and picked up by the capacitive based sensor due to electrostatic coupling established between the tip and a portion of the matrix of electrode junctions. The position of the stylus is detected and provides input to a computing device associated with the digitizer system.

SUMMARY

According to an aspect of some exemplary embodiments, there is provided a method for improving the signal to noise ratio (SNR) of a signal transmitted by a handheld device detected on a digitizer sensor. Typically, both axes of a digitizer sensor are sampled and the signal emitted by the handheld device is detected on each of the axes. At times, output from one axis is significantly noisier than the other due to a positioning of the hand holding the handheld device. In some exemplary embodiments, a characterization of the transmitted signal is extracted from the output on the axis that is free from hand input. Based on the characterization, the signal from the handheld device can be separated from added noise added due to the hand. Optionally, the characterization is the phase of the signal and amplitude associated with the determined phase of the signal is separated from the rest of the output that is derived from input in other phases.

Unless otherwise defined, all technical and/or scientific terms used herein have the same meaning as commonly understood by one of ordinary skill in the art. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DETAILED DESCRIPTION

According to an aspect of some exemplary embodiments, the SNR of signals picks-up by a digitizer sensor from a signal emitting handheld device is improved. According to some embodiments, the SNR of the signals detected by the digitizer sensor is improved by estimating a phase of the signals detected and extracting a portion of the output associated with and optionally close to the determined phase. The signals with the improved SNR ratio provide for more accurate determination of a position of the handheld device as well as improved extraction of information encoded in the signal transmitted by the handheld device. A stylus is one example of a handheld device. The signals with the improved SNR ratio may provide for more accurate determination of position of a writing tip of the stylus as well as improved extraction of information encoded in the stylus signal typically transmitted at the writing tip.

There may be a variety of noise sources associated with the digitizer sensor in a frequency range of a signal that is transmitted by a handheld device, e.g. a stylus. The most common signals interfering with signals from the handheld device may be signals that originate from a user's hand touching or hovering over the digitizer sensor while holding the handheld device. Often, position of a hand holding the handheld device is such that sensing lines only one of the axes of the digitizer sensor that receive input from the handheld device is contaminated with hand input to the digitizer sensor while sensing lines along the other axis that receive input from the handheld device is free from hand input.

According to some exemplary embodiments, the phase of the signal transmitted by the handheld device is determined based on output from one or more antennas along the axes that is identified as not being contaminated by hand input. The signal detected on the other axes may be estimated as having a same phase with an adjustment based on its estimated location on the digitizer sensor. Typically, the phase of the detected signal varies with distance between a location along the axis at which the signal is picked-up and a location at which the output is sampled. The adjustment required may be determined based on empirical data.

Based on the estimated phase, noise on the contaminated axis may be reduced by extracting the output signal at the estimated phase from the rest of the output signal. It is noted that the output signal at the estimated phase may still include noise in the estimated phase. However, since in most cases the noise is uncorrelated with the signal transmitted by the handheld device, removing noise associated with other phase as described herein may significantly improve the SNR. Optionally, based on this method the SNR may be improved on average by about 3 dB. In some exemplary embodiments, this method is used in conjunction with other noise removal methods for improving the SNR of signals detected with the digitizer sensor.

Figure 1:
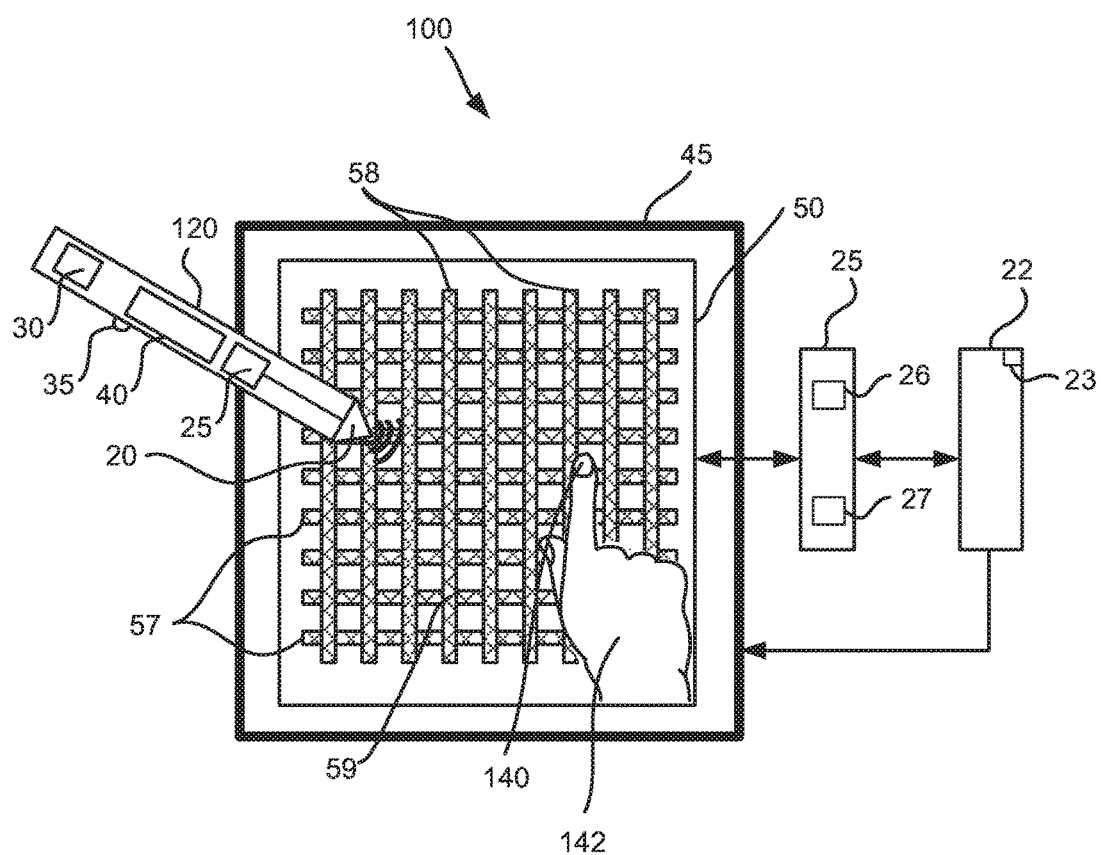
FIG. 1 is a simplified block diagram of an exemplary touch enabled computing device in accordance with some embodiments of the present disclosure.

Reference is now made to FIG. 1 showing a simplified block diagram of an exemplary touch enabled computing device in accordance with some embodiments of the present disclosure. According to some embodiments of the present disclosure, a computing device 100 includes a display 45 integrated with a digitizer sensor 50. In some exemplary embodiments, digitizer sensor 50 is a grid based capacitive sensor formed with row conductive strips 57 and column conductive strips 58 forming grid lines of the grid based sensor. Typically, row conductive strips 57 and column conductive strips 58 are electrically insulated from one another and each of conductive strips is connected at least at on one end to digitizer circuitry 25. Typically, row conductive strips 57 and column conductive strips 58 are arranged to enhance capacitive coupling between row conductive strips 57 and column conductive strips 58, e.g. around junctions 59 formed between rows and columns. The capacitive coupling formed between row conductive strips 57 and column conductive strips 58 is sensitive to presence of conductive and dielectric objects. Alternatively, digitizer sensor formed with a matrix of electrode junctions that is not necessarily constructed based on row and column conductive strips.

According to some embodiments of the present disclosure, row conductive strips 57 and column conductive strips 58 are operative to detect touch of one or more fingertips 140 or hand 142 or other conductive objects as well as a stylus 120 transmitting an electromagnetic signal typically via a writing tip 20 of the stylus 120. Digitizer circuitry 25 samples output from both the row conductive strips 57 and the column conductive strips 58 to detect a signal emitted via writing tip 20 of stylus 120. Digitizer circuitry 25 also applies mutual capacitance detection or a self-capacitance for sensing a touch signal from touch (or hover) of fingertip 140. Typically, during mutual capacitance and self-capacitance detection, digitizer circuitry 25 sends a triggering signal, e.g. pulse to one or more conductive strips 57 (or one or more conductive strips 58) of digitizer sensor 50 and samples output from conductive strips 58 (or from conductive strips 57) in response to the triggering and/or interrogation. In some embodiments, some or all of conductive strips along one axis of the grid are triggered simultaneously or in a consecutive manner, and in response to each triggering, outputs from conductive strips along the other axis are sampled. Typically, this procedure provides for detecting coordinates of multiple fingertips 140 touching sensor 50 at the same time (multi-touch). Digitizer circuitry 25 typically includes finger detection engine 26 for managing the triggering signal, for processing the touch signal and for tracking coordinates of one or more fingertips 140.

Digitizer circuitry 25 also typically includes stylus detection engine 27 for synchronizing with stylus 120, for processing input received by stylus 120 and/or for tracking coordinates of stylus 120. Typically, output from both row conductive strips 57 and column conductive strips 58, e.g. from two perpendicular axes are sampled to detect coordinates of stylus 120.

Typically, stylus 120 includes an ASIC 40 that controls generation of a signal emitted by stylus 120. ASIC 40 typically encodes information generated, stored or sensed by stylus 120 on the signal transmitted by stylus 120. Typically, stylus detection engine 27 decodes information received from stylus 120. Optionally, other handheld devices configured to interact with digitizer sensor 50 may be operated in a similar manner and tracked by stylus detection engine 27.

Typically, output from digitizer circuitry 25 is reported to host 22. Typically, the output provided by digitizer circuitry 25 may include coordinates of one or more fingertips 140, coordinates of writing tip 20 of stylus 120 and additional information provided by stylus 120, e.g. pressure, tilt, and battery level. Typically, digitizer circuitry 25 uses both analog and digital processing to process signals detected with digitizer sensor 50. Optionally, some or all of the functionalities of engines 26 and 27 are integrated in one or more processing units adapted for controlling operation of digitizer sensor 50. Optionally, some or all of the functionalities of digitizer circuitry 25, engines 26 and 27 are integrated or included in host 22.

According to some exemplary embodiments, stylus 120 additionally includes a wireless communication unit 30, e.g. an auxiliary channel with Bluetooth communication, near field communication (NFC), radio frequency (RF) communication that communications with module 23 of host 22.

Figure 2:
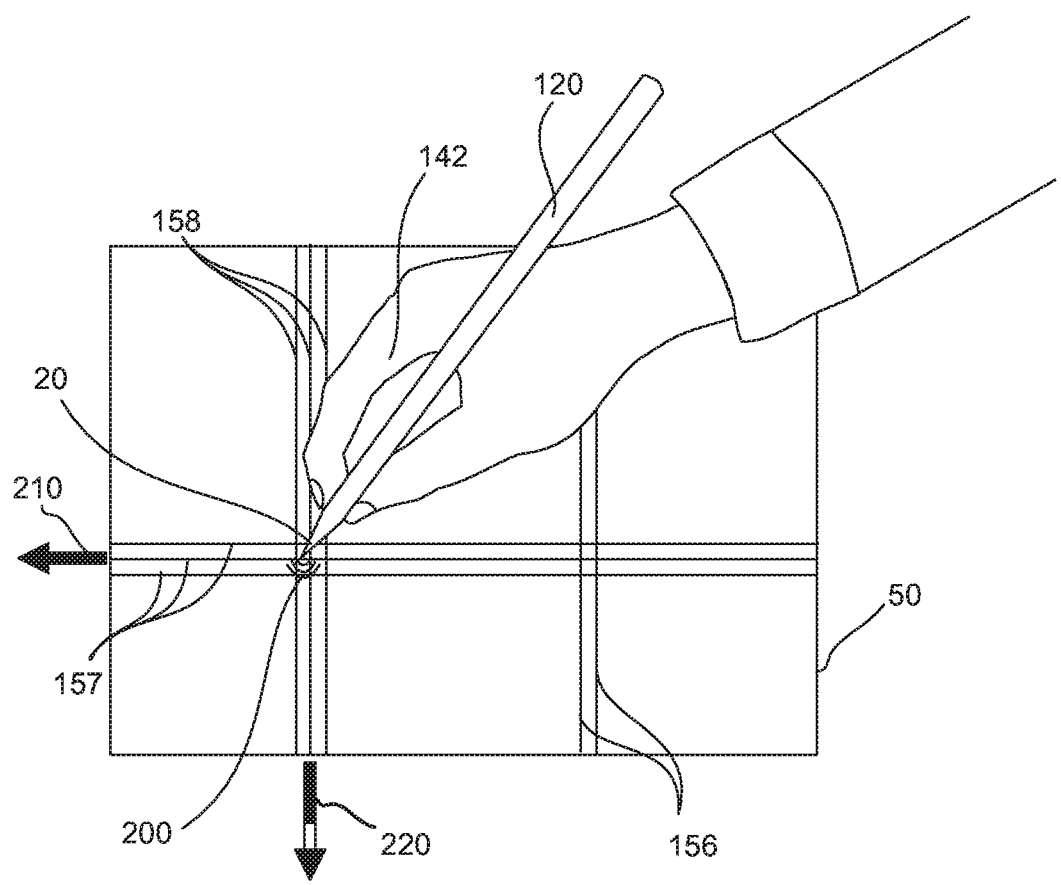
FIG. 2 is a schematic drawing illustrating how an exemplary presence of a hand holding a stylus may only affect the detected stylus signal on a particular axis in accordance with some embodiments of the present disclosure.

Reference is now made to FIG. 2 showing a schematic drawing illustrating how an exemplary presence of a hand holding a stylus may only affect the detected stylus signal on a particular axis in accordance with some embodiments of the present disclosure. While a user holds a stylus 120, output from tip 20 is detected on one or more row conductive strips 157 and one or more column conductive strips 158. Hand 142 holding stylus 120 may overlap some of the conductive strips that are picking up a stylus signal 200, e.g. conductive strips 158. Often hand 142 may be positioned in relationship to tip 20 so that hand 142 overlaps conductive strips 158 picking up output signal 210 along one axis of the digitizer sensor 50 and not conductive strips 157 picking up output signal 220 along the other axis of digitizer sensor 50. In another exemplary embodiment, hand 142 may overlap conductive strips 157 and may not overlap conductive strips 158.

Amplitude of an output 220 detected from conductive strips 158 in the frequency of emission from stylus 120 may be due to input derived from the presence of hand 142, stylus signal 200 as well as noise in the surrounding environment. Amplitude of an output 210 detected from conductive strips 157 may be due to stylus signal 200 and noise. Since hand 142 does not overlap conductive strips 157, output 210 is free from input due to hand 142.

Although both conductive strips 157 and 158 may include noise from other sources, the contribution of hand 142 to the amplitude of output 220 in a frequency of stylus emission may be significant. Amplitude detection, e.g. of amplitudes of outputs 210 and 220 is used both to track the position of the stylus and decode data encoded on signal 200. Optionally, stylus identification code, tip status, button status and other data encoded in stylus signal 200 are detected based on amplitude detection. Inaccuracies in amplitude received on conductive strips 157 may lead to inaccuracies in detecting position as well as loss of data encoded in stylus signal 200.

According to some exemplary embodiments, characterization of signals from one or more of conductive strip 157 is used remove some of the noise due to hand 142 and thereby improve the SNR in conductive strips 158.

The overall received signal on conductive strip 158 may be represented by the following equation:

$$V = Z_v S + Nv \quad \text{Equation (1)}$$

Where V is the overall signal received on conductive strips 158, S is the signal at tip 20, $Z_v$ is the transfer function from the tip position to conductive strips 158 and Nv is the noise due to hand 142.

The overall received signal on conductive strip 157 may be represented by the following equation:

$$H = Z_h S \quad \text{Equation (2)}$$

Where H is a signal received on conductive strips 157 with no interference due to hand 142 and $Z_h$ is the transfer function from the tip position to conductive strips 157. All values are complex in this representation and correspond to the phasor representation at the working frequency of stylus 120.

According to some exemplary embodiments, the phase of each of transfer functions $Z_v$ and $Z_h$ may be determined. The phase of $Z_h$ may be detected directly from output 210 and known transmission time of signal 200 transmitted from tip 20. The phase of $Z_v$ is expected to be close to that of $Z_h$ but with some variation due to location of tip 20 on digitizer sensor 50. Typically, as tip 20 moves away from an end of conductive strips 57 and 58 connected to circuit 25 the phase shifts. The shifting is typically slow and in some exemplary embodiments, there is about a 1° phase shift per junction 59. In some exemplary, empirical data may be used to define phase shifts due to position of tip 20. Phase of $Z_v$ may then be determined based on the phase detected on conductive strips 157 and the adjustment to the phase due to position of tip 20 using empirical based data or parameters stored in circuit 25. Typically, both position of tip 20 along conductive strip 157 and conductive strip 158 is considered when adjusting the measured phase on conductive strip 157 to define phase on conductive strips 158.

In order to determine amplitude $A_v=|Z_v\,S|$, Equation (1) and (2) may be combined to define the following relationship:

$$Z_v S = Z_v \times Z_h^{-1} \times H \qquad \text{Equation (3)}$$

The phase of Equation (3) is:

$$\varnothing_{V_S} = \angle(Z_v S) = \angle Z_v - \angle Z_h + \angle H \qquad \text{Equation (4)}$$

The determined phase may be applied and used to estimate Av using the following equation:

$$\tilde{A}_v = \text{Real}(e^{-\varnothing V_S} \times V) = |Z_v S| + \text{Real}(N_v) \qquad \text{Equation (5)}$$

The signal is in the real axis and the estimation of Av includes also the real part of the residual noise Nv. The imaginary component only includes the noise and is therefore eliminated. For most cases where the noise is uncorrelated with signal 200, the SNR may be improved by approximately 3 dB. The noise that is removed may be due to hand 142 as well as to other sources of noise.

In some exemplary embodiments, this method of improving the SNR is used in addition to other method for removing contamination of the stylus signal 200 due to hand input. Methods for characterizing the noise in the frequency of emission of the stylus due to the presence of hand 142 are known and may be used to remove some of the noise in output 220 due to hand 142. For example, output in the frequency of emission of stylus 120 and in another frequency close to that frequency may be detected on a conductive strip(s) 156 that includes hand input but without stylus input. The same type of output may also be detected on conductive strips 157. A ratio between phasors in the frequency close to the frequency of emission of the stylus may be multiplied with the phasor in the frequency of emission of stylus 120 detected on conductive strip 156 to get an indication of the noise level in conductive strips 157 due to hand 142.

Figure 3:
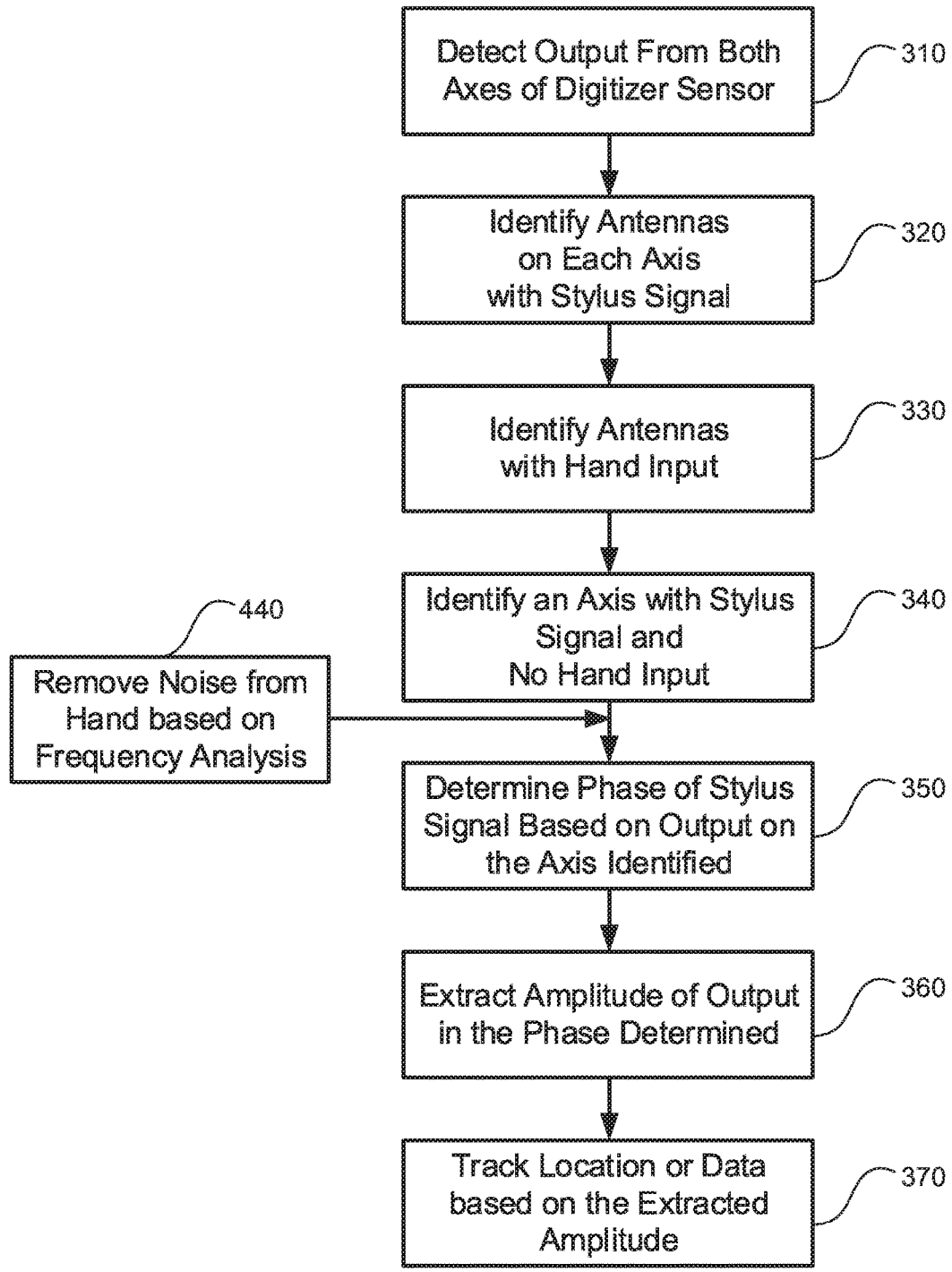
FIG. 3 is a simplified flow chart of an exemplary method for improving the SNR based on phase estimation in accordance with some embodiments of the present disclosure.

Reference is now made to FIG. 3 showing a simplified flow chart of an exemplary method for improving the SNR based on phase estimation in accordance with some embodiments of the present disclosure. Output from both row and column conductive strips (or antennas), e.g. conductive strips 57 and 58 are sampled by circuit 25 to detect a signal 200 emitted from a handheld device such as stylus 120 (block 310). Conductive strips 157 and 158 that pick-up stylus signal 200 are identified (block 320). Typically, stylus signal 200 may be identified based on detected amplitude of output detected at a defined frequency or frequency range. Filtering is typically applied to identify output in the defined frequency.

Location of a hand 142 touching or hovering over digitizer sensor 50 may also be detected (block 330). Optionally, hand input is detected during scanning of digitizer sensor 50 based on mutual capacitive detection or based on a self capacitive detection method.

According to some exemplary embodiments, location of hand 142 and approximate location of stylus signal 200 is compared and an axis including stylus input with no hand input is identified (block 340). According to some exemplary embodiments, phase of the stylus signal as detected on the axis without hand input is determined. Based on the detected phase, the phase of stylus signal as detected on the axis including hand input is estimated (block 350). In some exemplary embodiments, the phase on the axis including hand input is the detected phase on the axis without hand input with an adjustment based on the approximate location of the stylus tip along each of the axes. Typically, the phase detected is sensitive to distance between a location at which the signal is emitted and a location at which it is sampled. According to some exemplary embodiments, amplitude of the output in the estimated phase is determined (block 360) and tip location as well as data encoded in signal 200 is detected based on the amplitude in the estimated phase (block 370). In some exemplary embodiments, noise removal based on phase estimation is applied in concatenation with other noise removal methods to improve SNR. In some exemplary embodiments, noise due to the presence of a hand may first be removed based on frequency analysis (block 440). For example, noise level of hand input may be estimated on antennas not including the stylus signal and the estimated level may be used to reduce noise on antennas including both hand and stylus input. The output obtained after noise removal based on frequency analysis may be further processed to remove additional noise based on phase analysis.

According to an aspect of some exemplary embodiments, there is provided a method comprising: detecting a first signal on first electrodes along a first axis of a digitizer sensor; detecting a second signal on second electrodes along a second axis of the digitizer sensor; determining that hand input exists over the first electrodes based at least on the first signal; determining that no hand input exists over the second electrodes; determining a first phase of the first signal detected on the second electrodes; estimating a second phase of the second signal detected on the first electrodes based on the first phase; extracting a portion of the first signal associated with the second phase; determining coordinates of a handheld device based on the portion of the first signal extracted from the first electrodes and the second signal; and reporting the coordinates to a host computing device associated with the digitizer sensor.

Optionally, the first signal detected on the first electrodes and the second signal detected on the second electrodes are based on a radiated signal transmitted by the handheld device.

Optionally, the method includes estimating location of the handheld device based on the first signal and the second signal and estimating the second phase based on the location estimated.

Optionally, the estimating of the second phase based on the location estimated is based on empirical data.

Optionally, the method includes removing noise from the first signal based on characterization of the hand input in a frequency range of the signal transmitted by the handheld device.

Optionally, the hand input is detected based on a mutual capacitive detection method.

Optionally, the hand input is detected based on a self capacitive detection method.

Optionally, amplitude of the output is adjusted based on the extracting.

Optionally, the method includes decoding information embedded in at least one of the first and second signal and reporting the information to the host computing device.

An aspect of some exemplary embodiments provide a device comprising: a digitizer sensor including electrodes extending along a first axis and a second axis of the digitizer sensor, wherein the electrodes are configured to pick up signals emitted by a handheld device and to sense presence of a hand with capacitive based detection; a circuit configured to: detect device first signal on first electrodes along the first axis and a second signal on second electrodes along the second axis; determine that hand input exists over the first electrodes based at least on the first signal; determine that no hand input exists over the second electrodes; determine a first phase of the first signal detected on the second electrodes; estimate a second phase of the second signal detected on the first electrodes based on the first phase; extract a portion of an output on the first electrodes associated with the second phase; determine coordinates of a handheld device based on the portion of the output extracted from the first electrodes and the second signal; and report the coordinates to a host computing device associated with the digitizer sensor.

Optionally, the first signal detected on the first electrodes and the second signal detected on the second electrodes are based on a radiated signal transmitted by the handheld device.

Optionally, the circuit is configured to estimate location of the handheld device based on the first signal and the second signal and estimating the second phase based on the location estimated.

Optionally, the estimating of the second phase based on the location estimated is based on empirical data.

Optionally, the circuit is configured to remove noise from the first signal based on characterization of the hand input in a frequency range of the signal transmitted by the handheld device.

Optionally, the hand input is detected based on a mutual capacitive detection method.

Optionally, the hand input is detected based on a self capacitive detection method.

Optionally, amplitude of the output is adjusted based on the extracting.

Optionally, the circuit is configured to decode information embedded at least one of the first and second signal and reporting the information to the host computing device.

According to an aspect of some exemplary embodiments, there is provided a method comprising: detecting a first signal on first electrodes along a first axis of a digitizer sensor; detecting a second signal on second electrodes along a second axis of the digitizer sensor, wherein the first signal detected on the first electrodes and the second signal detected on the second electrodes are based on a radiated signal transmitted by a handheld device; determining that hand input exists over the first electrodes based at least on the first signal; determining that no hand input exists over the second electrodes; removing noise from the first signal based on characterization of the hand input in a frequency range of the signal transmitted by the handheld device; determining a first phase of the first signal detected on the second electrodes; estimating a second phase of the second signal detected on the first electrodes based on the first phase; further removing noise in the first signal by extracting a portion of the first signal associated with the second phase, wherein the extracting is performed on the first signal after removing the noise based characterization of the hand input in a frequency range; and determining coordinates of a handheld device based on the portion of the output extracted from the first electrodes and the second signal; and reporting the coordinates to a host computing device associated with the digitizer sensor.

Optionally, the method includes estimating location of the handheld device based on the first signal and the second signal and estimating the second phase based on the location estimated.

Certain features of the examples described herein, which are, for clarity, described in the context of separate embodiments, may also be provided in combination in a single embodiment. Conversely, various features of the examples described herein, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

What is claimed is:

1. A method comprising:
    detecting a first signal on first electrodes along a first axis of a digitizer sensor;
    detecting a second signal on second electrodes along a second axis of the digitizer sensor;
    determining that hand input exists over the first electrodes based at least on the first signal;
    determining that no hand input exists over the second electrodes;
    determining a first phase of the second signal detected on the second electrodes;
    estimating a second phase of the second signal detected on the first electrodes based on the first phase;
    extracting a portion of the first signal associated with the second phase;
    determining coordinates of a handheld device based on the portion of the first signal extracted from the first electrodes and the second signal; and
    reporting the coordinates to a host computing device associated with the digitizer sensor.

2. The method of claim 1, wherein the first signal detected on the first electrodes and the second signal detected on the second electrodes are based on a radiated signal transmitted by the handheld device.

3. The method of claim 2, comprising estimating location of the handheld device based on the first signal and the second signal and estimating the second phase based on the location estimated.

4. The method of claim 3, wherein the estimating of the second phase based on the location estimated is based on empirical data.

5. The method of claim 2, comprising removing noise from the first signal based on characterization of the hand input in a frequency range of the signal transmitted by the handheld device.

6. The method of claim 1, wherein the hand input is detected based on a mutual capacitive detection method.

7. The method of claim 1, wherein the hand input is detected based on a self capacitive detection method.

8. The method of claim 1, wherein amplitude of the output is adjusted based on the extracting.

9. The method of claim 1, comprising decoding information embedded in at least one of the first and second signal and reporting the information to the host computing device.

10. A device comprising:
   a digitizer sensor including electrodes extending along a first axis and a second axis of the digitizer sensor, wherein the electrodes are configured to pick up signals emitted by a handheld device and to sense presence of a hand with capacitive based detection;
   a circuit configured to:
      detect device first signal on first electrodes along the first axis and a second signal on second electrodes along the second axis;
      determine that hand input exists over the first electrodes based at least on the first signal;
      determine that no hand input exists over the second electrodes;
      determine a first phase of the second signal detected on the second electrodes;
      estimate a second phase of the second signal detected on the first electrodes based on the first phase;
      extract a portion of an output on the first electrodes associated with the second phase;
      determine coordinates of a handheld device based on the portion of the output extracted from the first electrodes and the second signal; and
      report the coordinates to a host computing device associated with the digitizer sensor.

11. The device of claim 10, wherein the first signal detected on the first electrodes and the second signal detected on the second electrodes are based on a radiated signal transmitted by the handheld device.

12. The device of claim 11, wherein the circuit is configured to estimate location of the handheld device based on the first signal and the second signal and estimating the second phase based on the location estimated.

13. The device of claim 11, wherein the estimating of the second phase based on the location estimated is based on empirical data.

14. The device of claim 11, wherein the circuit is configured to remove noise from the first signal based on characterization of the hand input in a frequency range of the signal transmitted by the handheld device.

15. The device of claim 10, wherein the hand input is detected based on a mutual capacitive detection method.

16. The device of claim 10, wherein the hand input is detected based on a self capacitive detection method.

17. The device of claim 10, wherein amplitude of the output is adjusted based on the extracting.

18. The device of claim 10, wherein the circuit is configured to decode information embedded at least one of the first and second signal and reporting the information to the host computing device.

19. A method comprising:
   detecting a first signal on first electrodes along a first axis of a digitizer sensor;
   detecting a second signal on second electrodes along a second axis of the digitizer sensor, wherein the first signal detected on the first electrodes and the second signal detected on the second electrodes are based on a radiated signal transmitted by a handheld device;
   determining that hand input exists over the first electrodes based at least on the first signal;
   determining that no hand input exists over the second electrodes;
   removing noise from the first signal based on characterization of the hand input in a frequency range of the signal transmitted by the handheld device;
   determining a first phase of the second signal detected on the second electrodes;
   estimating a second phase of the second signal detected on the first electrodes based on the first phase;
   further removing noise in the first signal by extracting a portion of the first signal associated with the second phase, wherein the extracting is performed on the first signal after removing the noise based characterization of the hand input in a frequency range; and
   determining coordinates of a handheld device based on the portion of the output extracted from the first electrodes and the second signal; and
   reporting the coordinates to a host computing device associated with the digitizer sensor.

20. The method of claim 19, comprising estimating location of the handheld device based on the first signal and the second signal and estimating the second phase based on the location estimated.

* * * * *